United States Patent [19]
Taira et al.

[11] Patent Number: 5,531,019
[45] Date of Patent: Jul. 2, 1996

[54] SOLID OXIDE FUEL CELL AND MANUFACTURING METHOD THEREOF

[75] Inventors: Hiroaki Taira; Michiaki Iha; Hiroshi Takagi, all of Nagaokakyo, Japan

[73] Assignee: Murata Manufacturing Co., Ltd., Japan

[21] Appl. No.: 430,403

[22] Filed: Apr. 28, 1995

Related U.S. Application Data

[62] Division of Ser. No. 209,109, Mar. 9, 1994, abandoned.

[30] Foreign Application Priority Data

Mar. 10, 1993 [JP] Japan .................................. 5-48841
Jun. 28, 1993 [JP] Japan .................................. 5-157147
Mar. 1, 1994 [JP] Japan .................................. 6-30740

[51] Int. Cl.$^6$ .................................................. H01M 6/00
[52] U.S. Cl. ...................... 29/623.5; 29/623.3; 427/115; 156/89; 156/153; 429/30; 429/33; 429/41
[58] Field of Search ............... 427/115; 29/623.5, 29/623.3; 156/89, 153; 429/30, 33, 41

[56] References Cited

U.S. PATENT DOCUMENTS 5,312,700  5/1994  Ishida ..................................... 427/115

FOREIGN PATENT DOCUMENTS 4190564  11/1990  Japan .

*Primary Examiner*—Bruce F. Bell
*Attorney, Agent, or Firm*—Ostrolenk, Faber, Gerb & Soffen

[57] ABSTRACT

A solid oxide fuel cell which has a fuel electrode and an air electrode respectively on a first surface and on a second surface of a solid electrolyte. The interface between the solid electrolyte and the fuel electrode, and the interface between the solid electrolyte and the air electrode are roughened. An exemplary way of roughening the interfaces is as follows: a green sheet of solid electrolyte, a green sheet of fuel electrode and a green sheet of air electrode are laminated with the green sheet of electrolyte in the middle; sandpaper is put on each of the green sheet of fuel electrode and the green sheet of air electrode with a plastic film in-between in such a manner that the rough surfaces of the sandpaper face the green sheets of electrode; the laminate of green sheets is press-fixed, whereby the rough surfaces of the sandpaper roughen the interfaces; and the sandpaper and the plastic films are removed.

4 Claims, 2 Drawing Sheets

SOLID OXIDE FUEL CELL AND MANUFACTURING METHOD THEREOF

This is a division of application Ser. No. 08/209,109, filed Mar. 9, 1994 now abandoned.

BACKGROUND OF THE INVENTION

1. Field of the Invention

The present invention relates to a solid oxide fuel cell.

2. Description of Related Art

In a solid oxide fuel cell, electrode reaction occurs on the interface between a solid electrolyte, an electrode and a gaseous phase. Accordingly, in order to improve the efficiency of power generation of the solid oxide fuel cell, the area of the interface among the three elements should be increased. In the light of this point, conventionally, it has been tried to make an electrode of fine structure by using a material of smaller particles, but this has not brought any satisfying results.

SUMMARY OF THE INVENTION

An object of the present invention is to provide a solid oxide fuel cell which has a larger effective electrode area, and manufacturing method thereof.

In order to attain the object, a solid oxide fuel cell according to the present invention has a solid electrolyte which has electrodes on its two major surfaces, and the interfaces between the solid electrolyte and the electrodes are roughened.

In the structure, because of the toughened interfaces among the solid electrolyte and the electrodes, the solid oxide fuel cell obtains a larger effective electrode area than a conventional one.

The following is an exemplary way of roughening the interfaces: a green sheet of solid electrolyte, a green sheet of fuel electrode and a green sheet of air electrode are laminated with the green sheet of solid electrolyte in the middle; further, a sheet of sandpaper is put on each of the green sheet of fuel electrode and the green sheet of electrode with a plastic film in-between in such a manner that the rough surfaces of the sandpaper face the respective green sheets of fuel electrode and of air electrode; and the laminated green sheets are press-fixed. In this way, the interfaces among the solid electrolyte and the electrodes are roughened by the rough surfaces of the sandpaper.

BRIEF DESCRIPTION OF THE DRAWINGS

This and other objects and features of the present invention will be apparent from the following description with reference to the accompanying drawings, in which.

DETAILED DESCRIPTION OF THE PREFERRED EMBODIMENTS

Exemplary solid oxide fuel cells and exemplary manufacturing processes thereof according to the present invention are hereinafter described with reference to the accompanying drawings.

First Embodiment: See FIGS. 1 and 2

A first embodiment is a solid oxide fuel cell wherein the interfaces among the solid electrolyte and the electrodes are roughened by use of sandpaper.

A process of making a green sheet of fuel electrode is described. The same weight of nickel oxide powder and yttrium stabilized zirconia powder, which are materials of ceramics, are mixed together to form a conductive powder. Then, a proper weight of binder, such as polyvinyl butyral binder, and a proper weight of solvent, such as ethanol and toluene, are added so as to change the conductive powder into a slurry. Further, cellulose powder whose particles average 10 μm in diameter is added to the slurry in a weight ratio of 30 to 100. A green sheet of fuel electrode which is 50 to 100 μm in thickness is made of the slurry the doctor-blade method.

Next, a process of making a green sheet of air electrode is described. This process is similar to the process of making a green sheet of fuel electrode. A proper weight of binder, such as polyvinyl butyral binder, and a proper weight of solvent, such as ethanol and toluene, are added to lanthanum manganite powder, and thus, a slurry of lanthanum manganite is made. Further, cellulose powder whose particles average 10 μm in diameter is added to the slurry in a weight ratio of 30 to 100. A green sheet of air electrode which is 50 to 100 μm in thickness is made of the slurry by the doctor-blade method.

Further, green sheets of yttrium stabilized zirconia, which will be made into a solid electrolyte, are made. A proper weight of binder, such as polyvinyl butyral binder, and a proper weight of solvent, such as ethanol and toluene, are added to yttrium stabilized zirconla powder, and thus, a slurry of yttrium stabilized zirconia is made. Then, a green sheet of solid electrolyte is made of the slurry by the doctor-blade method. Since the solid electrolyte requires density, cellulose powder is not added.

Figure 1:
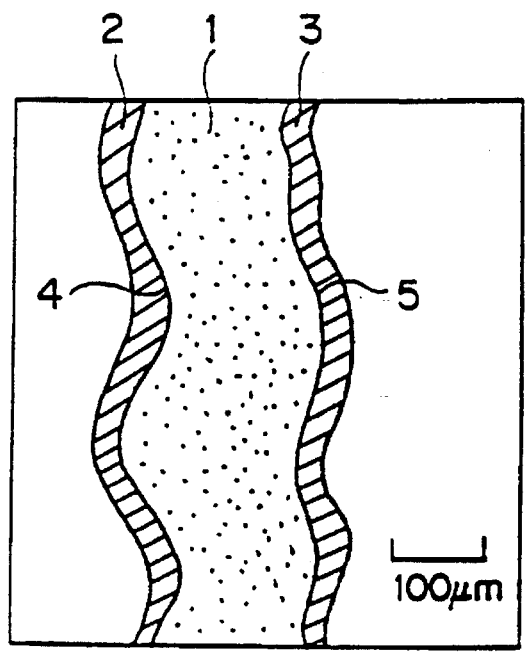
FIG. 1 is an enlarged sectional view of a solid electrolyte having electrodes on both sides, the solid electrolyte being provided in a solid oxide fuel cell which is a first embodiment of the present invention.

Several green sheets of solid electrolyte are laminated, and a green sheet of fuel electrode and a green sheet of air electrode are put on the upper surface and the lower surface of the laminate of solid electrolyte green sheets 1. Further, a sheet of sandpaper (#100) is put on each of the green sheet of fuel electrode and the green sheet of air electrode with a plastic film in-between in such a manner that the rough surfaces of the sandpaper face the respective green sheets of fuel electrode and of air electrode. The sandpaper (#100) is made by solidifying grains of sand which are sieved by 100 meshes per square inch. The use of plastic films is for easy removal of the sandpaper after press-fixation of the laminate of green sheets. Then, the laminate of green sheets is put into a plastic bag, and vacuum applied. In this state, the green sheets are press-fixed together by a warm hydrostatic presser. Since the green sheet of fuel electrode 2 and the green sheet of air electrode 3 are thin, as shown in FIG. 1, the green sheets 2 and 3 are made rough by the rough surfaces of the sandpaper. Consequently, the interface 4 between the solid electrolyte 1 and the fuel electrode 2, and the interface 5 between the solid electrolyte 1 and the air electrode 3 are made rough. The roughness of the interfaces 4 and 5 is an average of about 50 μm. After the press-fixation, the laminate of green sheets is taken out of the plastic bag, and the sandpaper and the plastic films are removed. Then, the laminate of green sheets are cut into pieces of a specified size. These pieces are sintered under a temperature of 1300° C. for two hours. Thus, the green sheets of solid electrolyte, of fuel electrode and of air electrode are sintered simultaneously. During the sintering, the cellulose powder evaporates, and pores are made in the pieces where the cellulose powder existed. Thereafter, the pieces are cooled down to room temperature. In this way, a solid electrolyte 1 which has a porous fuel electrode 2 and a porous air electrode 3 on its upper side and lower side respectively is obtained.

A solid oxide fuel cell is produced by using the solid electrolyte 1 fabricated in the above process, and the power generation characteristic of the solid oxide fuel cell is examined. Table 1 shows the result. Table 1 also shows, for comparison, the power generation characteristic of a solid oxide fuel cell which is produced by using a solid electrolyte fabricated without using the sandpaper.

TABLE 1

|  | Electrode | Voltage Fall Caused by Polarization |
| --- | --- | --- |
| First Embodiment | fuel electrode | 60 mV |
|  | air electrode | 50 mV |
| First Comparative Example | fuel electrode | 150 mV |
|  | air electrode | 110 mV |

Figure 2:
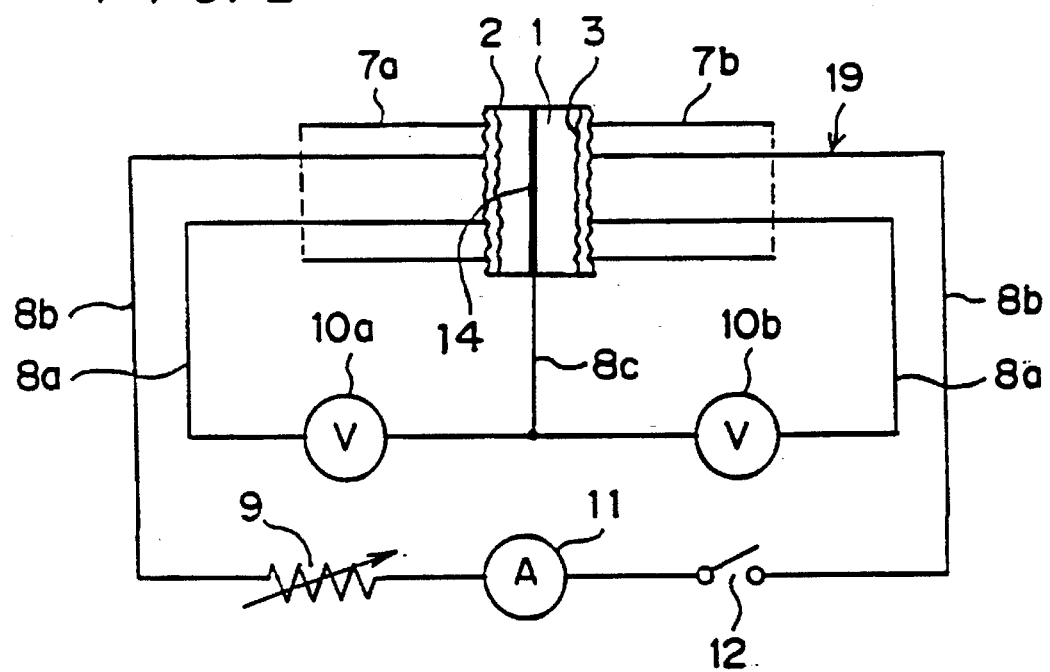
FIG. 2 is an electrical circuit diagram of a measuring circuit for measuring the efficiency of power generation of the solid oxide fuel cell.

The power generation characteristics of the solid oxide fuel cells of the first embodiment and of the first comparative example are examined by using a measuring circuit as shown in FIG. 2. The solid oxide fuel cell of the first embodiment is completed by connecting a fuel gas supply tube 7a and an air supply tube 7b to the fuel electrode 2 and the air electrode 3 respectively. This solid oxide fuel cell is connected to a measuring circuit 19 for an examination of its power generation characteristic. A fuel gas and air are supplied to the electrodes 2 and 3 respectively while the solid oxide fuel cell is kept under a temperature of 1000° C., and an electrode reaction occurs via the solid electrolyte 1. In this state, while a flow of a current of 300 mA per square centimeter is detected by an ampere meter 11, voltage falls on the electrodes 2 and 3 are measured by oscilloscopes 10a and 10b in the current interrupt method. In FIG. 2, numeral 14 denotes a reference electrode, numerals 8a, 8b and 8c denote platinum lines, numeral 9 denotes a variable resistor, and numeral 12 denotes a mercury switch. A result that the voltage falls caused by polarization are small indicates that the effective electrode area is large, and accordingly indicates that the solid oxide fuel cell has a high efficiency. As can be seen in Table 1, the solid oxide fuel cell of the first embodiment has lower voltage falls than the first comparative example. Accordingly, the solid oxide fuel cell of the first embodiment has a larger effective electrode area than the first comparative example.

Referring to FIG. 1, the effective areas of the interfaces 4 and 5 are about 1.5 times of those of flat interfaces. However, as is apparent from Table 1, the voltage falls of the first embodiment are about a half or one third of those of the first comparative example. This may be because the enlargement of the areas of the interfaces among the solid electrolyte 1 and the electrodes 2 and 3 strengthens the adherence among these elements 1, 2 and 3, which lowers the internal impedance of the solid oxide fuel cell.

Second Embodiment: See FIG. 3

A second embodiment is a solid oxide fuel cell wherein the interfaces among the solid electrolyte and the electrodes are toughened by use of a grainy electrolyte.

A process of making a green sheet of fuel electrode is described. Nickel oxide powder and yttrium stabilized zirconia powder are mixed together, and a proper weight of binder, such as polyvinyl butyral binder, and a proper weight of solvent, such as ethanol and toluene, are added so as to change the powdery mixture into a slurry state. Further, cellulose powder whose particles average 10 μm in diameter is added to the slurry in a weight ratio of 30 to 100. A green sheet of fuel electrode is made of the slurry by the doctor-blade method.

A green sheet of air electrode is made in a similar process to the process of making a green sheet of fuel electrode. The main material of the air electrode is lanthanum strontium manganite.

A grainy electrolyte is spread out evenly on one side of the green sheet of fuel electrode and on one side of the green sheet of air electrode. The diameters of the particles of the grainy electrolyte are more than 10 μm in average and less than the thicknesses of a fuel electrode and an air electrode which will be finally formed in the following process. More specifically, in the second embodiment, yttrium stabilized zirconia whose particles are an average of about 30 μm in diameter is used.

A green sheet of solid electrolyte is made of yttrium stabilized zirconia. Powder of yttrium stabilized zirconia is mixed with a proper weight of binder and a proper weight of solvent to be in a slurry state. Then, a green sheet of solid electrolyte is made of the slurry by the doctor-blade method.

Figure 3:
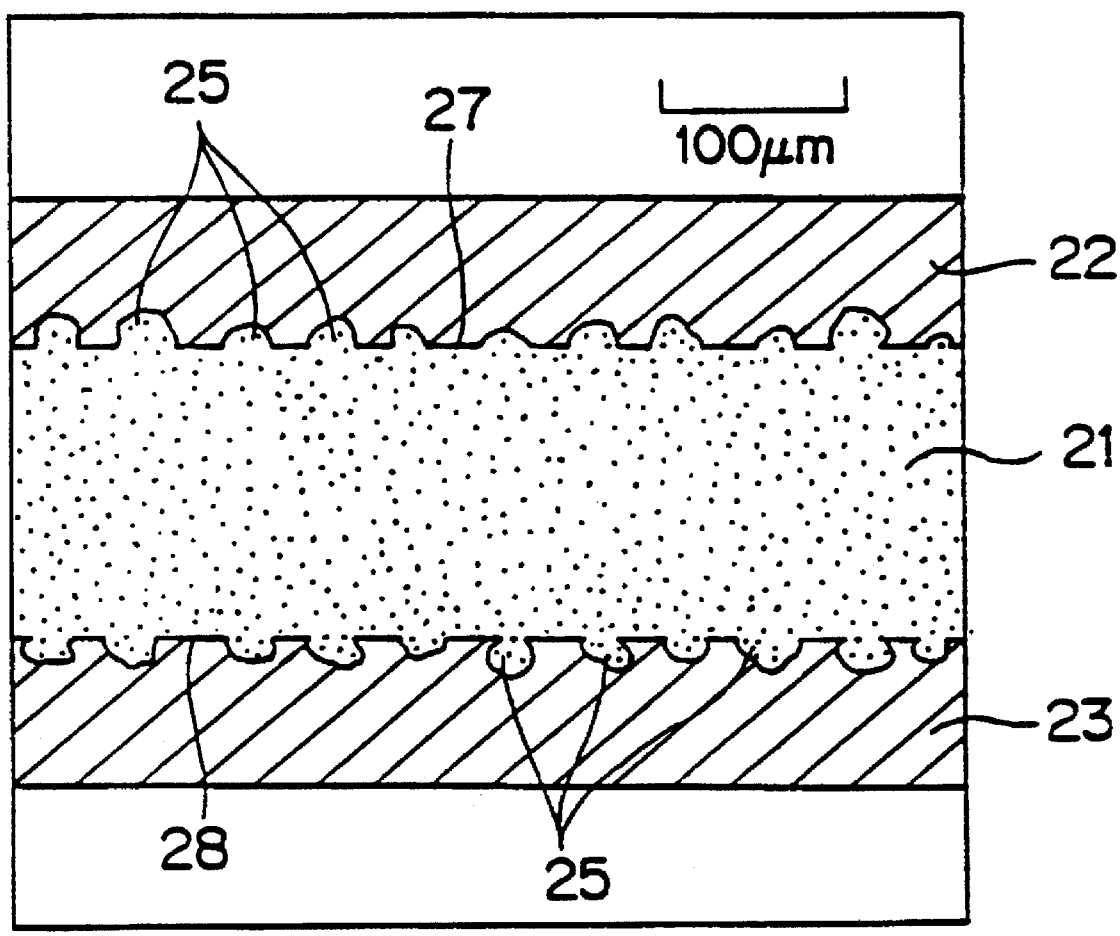
FIG. 3 is an enlarged sectional view of a solid electrolyte having electrodes on both sides, the solid electrolyte being provided in a solid oxide fuel cell which is a second embodiment of the present invention.

These green sheets are laminated with the green sheet of solid electrolyte in touch with the grainy electrolyte on the green sheets of electrode. More specifically, the green sheet of fuel electrode and the green sheet of air electrode are put on an upper side and a lower side of the green sheet of solid electrolyte respectively such that the grainy electrolyte on the respective green sheets of electrode faces the green sheet of solid electrolyte. Thereafter, the laminate of green sheets is put into a plastic bag, and the plastic bag is evacuated. In this state, the green sheets are press-fixed together by a warm hydrostatic presser. At that time, as shown in FIG. 3, grains of the electrolyte 25 spread on the green sheets of electrode 22 and 23 are embedded in the green sheets of electrode 22 and 23 and in the green sheet of solid electrolyte 21. Consequently, the interface 27 between the solid electrolyte 21 and the fuel electrode 22, and the interface 28 between the solid electrolyte 21 and the air electrode 23 are roughened.

After the press-fixation, the laminate of green sheets is taken out of the plastic bag and is sintered under a temperature of 1400° C. Thus, the green sheets of solid electrolyte, of fuel electrode and of air electrode are sintered simultaneously.

A solid oxide fuel cell is produced by using the solid electrolyte 21 fabricated in the above process, and the power generation characteristic of the solid oxide fuel cell is examined. Table 2 shows the result. Table 2 also shows, for comparison, the power generation characteristic of a solid oxide fuel cell using a solid electrolyte fabricated without using the grainy electrolyte.

TABLE 2

|  | Electrode | Voltage Fall Caused by Polarization |
| --- | --- | --- |
| Second Embodiment | fuel electrode | 35 mV |
|  | air electrode | 30 mV |
| Second Comparative Example | fuel electrode | 50 mV |
|  | air electrode | 46 mV |

The power generation characteristic of the solid oxide fuel cell is examined by use of the measuring circuit 19 described in connection with the first embodiment. The voltage fall on each electrode is measured while a current of 300 mA per square centimeter flows in the solid oxide fuel cell. As can be seen in Table 2, the voltage falls of the second embodiment are smaller than those of the second comparative example. Accordingly, the second embodiment has a larger effective electrode area than the second comparative example.

Third Embodiment

A third embodiment is, as the second embodiment, a solid oxide fuel cell wherein the interfaces among the solid electrolyte and the electrodes are toughened by use of a grainy electrolyte. In the third embodiment, however, another manufacturing method is adopted.

A process of making a solid electrolyte is described. Powder of yttrium stabilized zirconia is mixed with a proper weight of binder, such as polyvinyl acetate, and a proper weight of water to be in a slurry state. A green sheet of solid electrolyte is made of the slurry by extrusion molding. Then, a grainy electrolyte is spread out evenly on an upper side and a lower side of the green sheet of solid electrolyte. The diameters of the particles of the grainy electrolyte are more than 10 μm in average and less than the thicknesses of the fuel electrode and the air electrode which will be finally formed in the following process. More specifically, in the third embodiment, yttrium stabilized zirconia whose particles average about 30 μm in diameter is used. The green sheet of solid electrolyte is put into a plastic bag, and the plastic bag is evacuated. In this state, the grainy electrolyte is press-fixed on the green sheet of solid electrolyte by a warm hydrostatic presser. After the press-fixation, the green sheet of solid electrolyte is taken out of the plastic bag and is sintered under a temperature within a range from 1400° C. to 1500° C. Thus, a sintered sheet of solid electrolyte is made, and both sides of the solid electrolyte are roughened by the grainy electrolyte.

A fuel electrode paste is prepared in the following process. The same weight of nickel oxide powder and yttrium stabilized zirconia powder are mixed together. Then, a proper weight of vehicle is added so as to change the powdery mixture into a paste state.

An air electrode paste is prepared in a similar process to the process of preparing the fuel electrode paste. The main constituent of the air electrode paste is lanthanum strontium manganite.

The fuel electrode paste and the air electrode paste are coated on the upper side and the lower side of the sintered sheet of solid electrolyte respectively by screen printing. Since the upper side and the lower side of the sintered sheet of solid electrolyte are rough, the interface between the sintered sheet of solid electrolyte and the fuel electrode paste, and the interface between the sintered sheet of solid electrolyte and the air electrode paste become rough. Thereafter, the sintered sheet of solid electrolyte with the pastes thereon is sintered under a temperature within a range from 1200° C. to 1400° C. Obtained in this way is a solid electrolyte with a porous fuel electrode and a porous air electrode, the interfaces among the solid electrolyte, the fuel electrode and the air electrode being rough.

A solid oxide fuel cell is produced by using the solid electrolyte fabricated in the above process, and the power generation characteristic of the solid oxide fuel cell is examined. Table 3 shows the result. Table 3 also shows, for comparison, the power generation characteristic of a solid oxide fuel cell which is produced by using a solid electrolyte fabricated without using the grainy electrolyte.

TABLE 3

|  | Electrode | Voltage Fall Caused by Polarization |
| --- | --- | --- |
| Third Embodiment | fuel electrode | 40 mV |
|  | air electrode | 40 mV |
| Third Comparative Example | fuel electrode | 65 mV |
|  | air electrode | 60 mV |

The power generation characteristic of the solid oxide fuel cell is examined by use of the measuring circuit 19 described in connection with the first embodiment. As can be seen in Table 3, the voltage falls caused by polarization in the third embodiment are smaller than those in the third comparative example. Accordingly, the third embodiment has a larger effective electrode area than the third comparative example.

Fourth Embodiment

In a fourth embodiment, another manufacturing method of a solid oxide fuel cell wherein the interfaces among the solid electrolyte and the electrodes are toughened by use of a grainy electrolyte is described.

A process of making a green sheet of solid electrolyte is described. Powder of yttrium stabilized zirconia is mixed with a proper weight of binder and a proper weight of solvent to be in a slurry state. A green sheet of solid electrolyte is made of the slurry by the doctor-blade method.

A process of making a green sheet of air electrode is described. Powder of lanthanum manganite is mixed with a proper weight of binder and a proper weight of solvent to be in a slurry state. Further, cellulose powder whose particles are an average of about 10 μm is added to the slurry in a weight ratio of 30 to 100. A green sheet of air electrode is made of the slurry by the doctor-blade method.

A green sheet of fuel electrode is made in a similar process to the process of making the green sheet of air electrode. The main materials of the fuel electrode are nickel oxide and yttrium stabilized zirconia.

Several green sheets of solid electrolyte are laminated, and a grainy electrolyte is spread out evenly on an upper side and on a lower side of the laminate of solid electrolyte green sheets. The diameters of the particles of the grainy electrolyte are more than 10 μm in average and less than the thicknesses of the fuel electrode and the air electrode which will be finally formed on a solid electrolyte in the following process. In the fourth embodiment, yttrium stabllized zirconia whose particles of average of about 30 μm in diameter is used. A green sheet of fuel electrode and a green sheet of air electrode are put on the upper side and on the lower side of the laminate respectively. Thereafter, the laminate of green sheets is put into a plastic bag, and the plastic bag is evacuated. In this state, the green sheets are press-fixed together by a warm hydrostatic presser. At that time, grains of the electrolyte spread on the green sheets of solid electrolyte are embedded in the green sheets of solid electrolyte and the green sheets of electrode. Consequently, the interface between the solid electrolyte and the fuel electrode, and the interface between the solid electrolyte and the air electrode are roughened. After the press-fixation, the laminate of green sheets is taken out of the plastic bag and is sintered under a temperature of 1400° C. for two hours. Thus, the green sheets of solid electrolyte, of fuel electrode and of air electrode are sintered simultaneously.

A solid oxide fuel cell is produced by using the solid electrolyte fabricated in the above process, and the power generation characteristic of the solid oxide fuel cell is examined. Table 4 shows the result. Table 4 also shows, for comparison, the power generation characteristic of a solid oxide fuel cell produced by using a solid electrolyte fabricated without using the grainy electrolyte.

TABLE 4

|  | Electrode | Voltage Fall Caused by Polarization |
| --- | --- | --- |
| Fourth Embodiment | fuel electrode | 38 mV |
|  | air electrode | 32 mV |
| Fourth Comparative Example | fuel electrode | 50 mV |
|  | air electrode | 46 mV |

The power generation characteristic of the solid oxide fuel cell is examined by use of the measuring circuit 19 described in connection with the first embodiment. As can be seen in Table 4, the voltage falls caused by polarization in the fourth embodiment are smaller than those in the fourth comparative example. Accordingly, the fourth embodiment has a larger effective electrode area than the fourth comparative example.

Other Embodiments

Another possible way of making rough interfaces among the solid electrolyte, the fuel electrode and the air electrode is adding cellulose powder whose particles are large (an average of about 100 µm in diameter) to the materials of the respective electrodes.

If the electrodes are made of the materials further containing a proper weight of electrolyte, the solid oxide fuel cell will have a higher power generation efficiency.

Although the present invention has been described in connection with the preferred embodiments, it is to be noted that various changes and modifications are possible to those who are skilled in the art. Such changes and modifications are to be understood as being within the scope of the invention.

What is claimed is:

1. A method for producing a solid oxide fuel cell, the method comprising the steps of:

spreading out a grainy electrolyte on a first surface and a second surface of a green sheet of solid electrolyte;

putting a green sheet of fuel electrode on the first surface of the solid electrolyte with the grainy electrolyte in-between and putting a green sheet of air electrode on the second surface of the solid electrolyte with the grainy electrolyte in-between to form a laminate of green sheets of solid electrolyte, of fuel electrode and of air electrode;

pressing the laminate of green sheets so that the green sheets are fixed together; and sintering the laminate of green sheets to obtain a solid electrolyte with a fuel electrode and an air electrode thereon.

2. A method for producing a solid oxide fuel cell as claimed in claim 1, wherein:

particles of the grainy electrolyte have diameters more than 10 µm in average and less than thicknesses of the fuel electrode and the air electrode.

3. A method for producing a solid oxide fuel cell as claimed in claim 2, wherein:

the particles of the grainy electrolyte have an average diameter of about 30 µm.

4. A method of producing a solid oxide fuel cell as claimed in claim 3, wherein:

the grainy electrolyte is yttrium stabilized zirconia powder.

\* \* \* \* \*